J. G. LEPPER.
BLOW-OVER REMOVER FOR BOTTLE MAKING MACHINES.
APPLICATION FILED NOV. 1, 1912.
1,124,475. Patented Jan. 12, 1915.
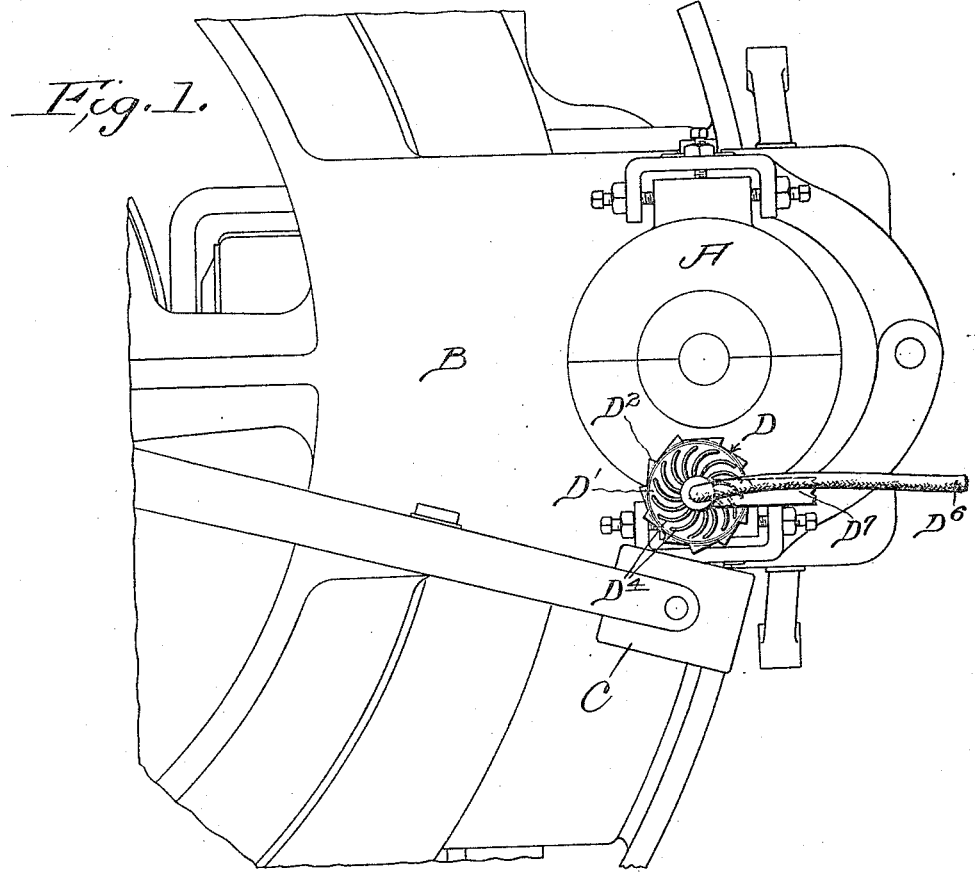
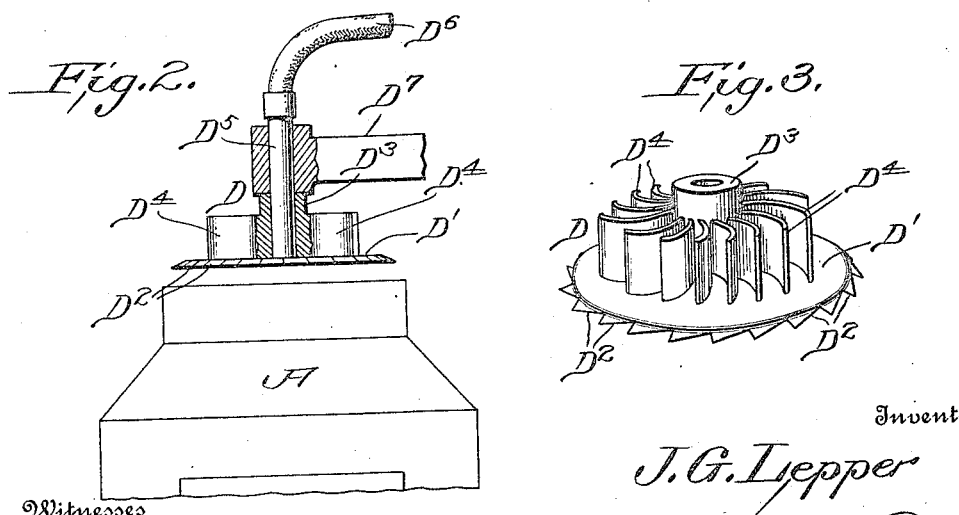
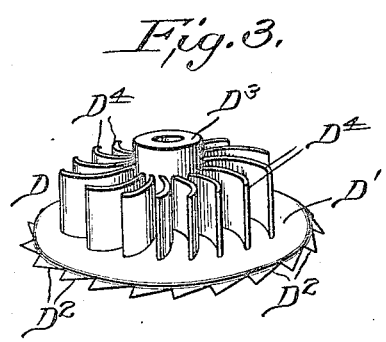

UNITED STATES PATENT OFFICE.

JOHN G. LEPPER, OF WATERBURY, CONNECTICUT, ASSIGNOR TO BOOTH, SCHELLINGER AND WILLIAMS COMPANY, A CORPORATION OF DELAWARE.

BLOW-OVER REMOVER FOR BOTTLE-MAKING MACHINES.

1,124,475.

Specification of Letters Patent. Patented Jan. 12, 1915.

Application filed November 1, 1912. Serial No. 729,143.

*To all whom it may concern:*

Be it known that I, JOHN G. LEPPER, a citizen of the United States, residing at Waterbury, in the county of New Haven and State of Connecticut, have invented a new and useful Improvement in Blow-Over Removers for Bottle-Making Machines, of which the following is a specification.

This invention relates generally to a bottle making machine and more particularly to a device intended to cut off and remove from the machine the "blow-over" formed upon the top of the bottle and mold during the molding operation.

In a machine for making bottles, such as shown and described in applications filed October 13, 1911, and January 3, 1912, a bottle mold is located upon a movable turret and the bottle is blown within the mold manually and after the bottle blowing operation has been accomplished the turret carrying the mold starts away from its initial position for the purpose of having the neck reheated by means of a movable glory hole and in order to remove the "blow-over" before the mold comes into alinement with the said glory hole I provide a device for cutting off and blowing away this "blow-over," and with this object in view, my invention consists in the novel features of construction and arrangement hereinafter fully described, and pointed out in the claims.

In the drawings forming a part of this specification: Figure 1 is a plan view of a portion of the bottle making machine showing the relative positions of the mold, glory hole and "blow-over" removed. Fig. 2 is a sectional elevation showing the relative positions of the bottle mold and "blow-over" remover and, Fig. 3 is a detail perspective view of the "blow-over" remover disconnected from any actuating mechanism.

Referring to the drawings, A indicates a bottle mold which is arranged upon a movable turret B, and C indicates the glory hole which is adapted to heat the neck of the bottle blown in the mold A so that an automatic finishing tool may be brought into operation upon the reheated neck of the molded bottle. Before, however, the neck can be reheated by means of the glory hole C it is necessary to remove the "blow-over" and in order to quickly and neatly accomplish this removal I provide a device adjacent to the initial position of the mold and glory hole and in line of movement of the mold, said device D comprising a flat circular disk D', the edge of which is beveled and serrated similar to a circular saw as shown at $D^2$, and this disk D' has a central hub $D^3$, from which radiate a series of curved wings or blades $D^4$. A shaft $D^5$ is secured in the hub $D^3$ and connected with a flexible shaft $D^6$ or this shaft $D^5$ may be provided with gears or rotated in any other suitable manner. This saw-toothed disk carrying the radial wings or blades is rotated very rapidly and consequently as it comes in contact with the "blow-over" it neatly cuts off the same and blows fine particles of glass completely away from the machine, thereby not only removing the "blow-over" but preventing the accumulation of glass in the machine. Furthermore the position of this device being fixed by means of a bracket $D^7$ it is obvious that the cutting off of the "blow-over" will be accurate leaving only a definite and fixed amount of glass projecting above the top of the mold, the relative positions of the bottle mold and remover being most clearly shown in Fig. 2.

A device constructed, arranged and operated as herein shown and described effectively cuts off and removes the "blow-over" and the molded bottle passes on to be operated upon by the movable glory-hole as described in the application previously referred to.

What I claim is:—

1. A device of the kind described comprising a rotating disk, the edge thereof being serrated, the upper surface of said disk being provided with radial wings.

2. A device of the kind described comprising a rotary disk, the edge of which is serrated, said disk having a central hub and radial wings extending therefrom, as set forth.

3. A device of the kind described comprising a rotary disk, the edge of which is serrated, said disk having a central hub and curved radial wings extending therefrom, together with means for rotating said disk, as set forth.

4. The combination with a mold adapted to travel in the arc of a circle, of a rotary disk arranged in the line of travel of said mold, the edge of said disk being serrated, and the upper surface of said disk being provided with radial wings together with means for rotating said disk, substantially as set forth.

5. The combination with a mold adapted to travel, of a "blow-over" remover arranged adjacent to said mold and in line of said travel whereby as the mold moves the "blow-over" of the bottle will be removed, as set forth.

JOHN G. LEPPER.

Witnesses:
  CHAS E. BROCK,
  SAMUEL P. WILLIAMS, Jr.